United States Patent [19]

Feneis, Jr. et al.

[11] 3,998,771
[45] Dec. 21, 1976

[54] WATER-BASED EPOXY RESIN ZINC-RICH COATING COMPOSITIONS

[75] Inventors: Thomas John Feneis, Jr., Freehold; Miles Talmadge Bryant, Highland Park, both of N.J.

[73] Assignee: Mobil Oil Corporation, New York, N.Y.

[22] Filed: Apr. 11, 1975

[21] Appl. No.: 567,164

[52] U.S. Cl. .................... 260/18 PN; 260/18 EP; 260/18 N; 260/37 EP; 260/37 M; 260/404.5

[51] Int. Cl.² ................................. C08J 3/20

[58] Field of Search ........ 260/18 N, 18 PN, 18 EP, 260/37 EP, 37 M, 404.5

[56] References Cited

UNITED STATES PATENTS

| 3,133,941 | 5/1964 | Edwards et al. | 260/404.5 |
| 3,257,342 | 6/1966 | Kwong | 260/18 PN |
| 3,499,853 | 3/1970 | Griebsch et al. | 260/18 N |
| 3,792,002 | 2/1974 | Krieger et al. | 260/18 N |
| 3,900,437 | 8/1975 | Preston | 260/18 PN |

FOREIGN PATENTS OR APPLICATIONS

| 889,562 | 2/1962 | United Kingdom | 260/37 M |

*Primary Examiner*—Eugene C. Rzucidlo
*Attorney, Agent, or Firm*—Charles A. Huggett; Hastings S. Trigg

[57] ABSTRACT

Water-based epoxy resin compositions comprising (A) a non-volatile liquid grade epoxy resin, (B) a modified polyamide, i.e., the reaction product of a polycarboxylic acid and a polyamine adducted with a liquid grade epoxy resin, e.g., diglycidyl ether of bis-phenol A, and (C) zinc dust provide coating compositions having excellent durability and corrosion resistance properties; especially adaptable for ferrous and cementitious surfaces.

6 Claims, No Drawings

WATER-BASED EPOXY RESIN ZINC-RICH COATING COMPOSITIONS

CROSS REFERENCE TO RELATED APPLICATIONS

Ser. No. 465,968 (Mobil Docket No. 8540) filed May 1, 1974 and now pending, entitled Water Soluable Polyamide, now abandoned.

BACKGROUND OF THE INVENTION

This invention relates to water-base epoxy resins suitable as coating compositions and for use in improved paint and varnish formulations, wherein it is desirable to have a water-base coating processing high durability and excellent corrosion resistance. This invention, more particularly, relates to a water-base epoxy resin composition comprising a liquid grade epoxy resin, a modified polyamide-epoxy adduct and zinc dust pigment.

Prior art water-based epoxy resins known to applicants generally utilized an emulsion and a solvent in their formulation. In contradistinction to such prior art, the instant compositions may contain no solvent thus eliminating the release of volatile solvents into the atmosphere nor is there any need to emulsify even the liquid components, thereby eliminating, interalia, freeze-thaw problems. However, the resins may be emulsified if desired. The instant unique water-based epoxy resin compositions when mixed in proportions disclosed herein and applied to, for example, a ferrous substrate provide a coating of superior quality having minimal odor, no irritating solvent vapors, ease of application, retention of color etc., and a wide range of uses in for example the primer coating field.

DESCRIPTION OF THE PRIOR ART

The compositions of the herein embodied invention, therefore, comprise (A) A low viscosity 100% nonvolatile liquid grade epoxy resin, for example, reaction product of bis-phenol A and epichlorohydrin, (B) a modified polyamide, i.e., an adduct of a water soluble polyamide and a liquid epoxy resin, and (C) zinc dust pigment. Accordingly, the compositions according to this invention in general consist of a water-based epoxy/polyamide resin comprising (A) from about 2–10 wt. %, based on the total weight of the composition, of a non-volatile liquid grade epoxy resin, e.g., a diglycidyl ether of bis-phenol A having an average epoxy equivalent weight of from about 140–480, and an average viscosity of from about 100–16,000 centiposies at 25° C, (B) a polyamide-epoxy resin adduct in which about 90 wt. %, of the adduct or about 2–10 wt. %, based on the total weight of the composition, is comprised of a water-soluble polyamide, said polyamide, being the reaction product of a polycarboxylic acid having from about 18–54 carbon atoms per carboxyl group and a polyamine-poly(oxyalkylene) amine, said amine having about 4–8 carbon atoms per primary amine group, said oxyalkylene amine having from about 2–8 carbon atoms in the longest alkylene group bridging two ether oxygen constituents thereof, is adducted with about 10 wt. % of said adduct or about 0.1–3.0 wt %, based on the total weight of the composition, of a liquid grade epoxy resin as described, and (C) from about 55–70 wt. %, based on the total weight of the composition, of a zinc pigment dust having an average particle size of from about 2–15 microns. Zinc dust with a particle size of 4–6 microns is preferred for better corrosion resistance.

Especially preferred are liquid grade epoxy resins having an average epoxy equivalent weight of from about 170–200 and an average viscosity of from about 500–22,500 centipoises at 25° C. The resins according to this invention may be used with or without a reactive or a non-reactive diluent and are readily available from numerous commercial sources.

Any of a number of suitable liquid grade epoxy resins may be used, preferably an epoxy resin selected from the group consisting of glycidyl, or diglycidyl ethers or a combination thereof of bis-phenol A. Especially preferred are such resins produced from the reaction of bis-phenol A and epichlorohydrin, designated diglycidyl ethers of bis-phenol A (DGEBA). These resins may be produced by any method known to the art by batch or continuous processes. DGEBA resins are prepared having a variety of molecular weights. Since most of the commercial liquid grade epoxy resins are, however, made from epichlorohydrin and bis-phenol A the basic difference is their molecular weight and the presence or nonpresence of a diluent. The resins embodied in this invention may, of course, be used with or without a diluent and if a diluent is used it may be reactive or nonreactive.

Diluents are usually employed to cure the resins, control viscosity and improve handling characteristics. For example, xylene, acetone, methylisobutylketone, methylethylketone, dibutylsulfate, nonylphenol and mixed solvents or diluents thereof are some of a nonexhaustive list of nonreactive diluents that may be used.

Reactive diluents, e.g., monoepoxy, may be used to reduce the functionality or reactivity of the resin system. Some common monoepoxy diluents are butylglycidyl ether, diglycidyl ether, allyglycidyl ether, glycidyl acrylate, phenyl glycidyl ether, resorcinol glycidyl ether, and butyl phenol cresyl ether. Also suitable as monoepoxy diluents are styrene oxide, vinyl cyclohexane monoxide and dipentine oxide. Some epoxy resins are also used as reactive diluents for DGEBA resins they, however, do not lower the functionality of the resin system as they reduce resin viscosity. Some such resins are vinyl cyclohexene dioxide, diglycidyl ether of 1-4 butane diol, bis(2,3-epoxycyclopentol) ether, triglycidyl ether of trimethyol propane and the like. The resin of Component A is generally used without solvent, however, it and the the resin of Component B may if desired contain a diluent.

As noted above, any suitable nonreactive or reactive diluent may be used, however, among the nonreactive diluents styrene and phenolic diluents have been used with great success and among the reactive diluents monoepoxy diluents have been very useful.

The modified polyamide is an adduct of a polyamide and a liquid grade epoxy resin. The liquid grade epoxy resin may be as described supra. Generally speaking, the resins utilized have an epoxy equivalent weight of from about 140–480 and their viscosity should range on the average from about 100–16,000 centiposies at 25° C.

Polyamides are generally made by the reaction of a polycarboxylic acid of its corresponding anhydride with an appropriate polyamine. Such a reaction is usually acid catalyzed and carried out in a liquid reaction medium such as water or a lower alcohol. Polyamides are synthesized as well by the ring opening of lacktams followed by linear condensation. There are any number of U.S. patents describing the production of suitable polyamide resins, for example U.S. Pat. No. 3,139,437 discloses a method of producing a polyamide by reacting an aliphatic polyamine with a polymeric fatty acid; U.S. Pat. No. 3,140,566 describes the production of polyamide resins by reacting a polyamine with a polycarboxylic acid such as diterpene acid.

The water soluble polyamide used in our compositions may be produced by reacting a polycarboxylic acid with a polyamine which contains at least one oxyalkylene group. Accordingly, the preferred water soluble polyamide is the reaction product of a polycarboxylic acid reactant and a polyamine reactant at least 10 mole percent of the polyamine reactant (based on stoichiometry) being poly(oxyalkylene) amine having from about 2-8 carbon atoms in the alkylene groups (i.e., the groups which join the ether oxygen atoms). Normally the water soluble polyamides so produced will have a molecular weight of from about 4,000-5,500.

The polycarboxylic reactant may be a carboxylic acid, ester, anhydride or a mixture thereof. The preferred acids are high molecular weight hydrocarbon acids having an average of 18-72 carbon atoms with 2-6 carboxyl groups. Suitable polycarboxylic acids are the commerical materials known as dimer acid and trimer acid. These acids have an average of 18-54 carbon atoms between adjacent carboxyl groups and are conventionally produced by dimerization or trimerization of unsaturated fatty carboxylic acids. Usually the unsaturated acids are oleic or linoleic acid contained in a mixture of acids hydrolyzed from naturally occurring fats and oils which are normally triglycerides of the acid.

The polyamine reactant may contain as little as 10% poly(oxyalkylene)amine with up to 90% polyalkylene amine present as remainder of the polyamine reactant; at least 25 mole % poly(oxyalkylene) reactant is preferred. The poly(alkylene) amine is suitably comprised of at least two primary amine groups per molecule with an alkylene group between adjacent primary amine groups which have 4-8 carbon atoms in its bridging chain. Such poly (alkylene)amines are exemplified by ethylene diamine, propylene diamine, hexamethylene diamine, diethylene triamine, tripropylene tetramine, and tetraethylene pentamine.

The alkylene group in the poly(oxyalkylene)amine should preferably have from about 2-8 carbon atoms between adjacent ether oxygen atoms if water solubility is to be maintained. Suitable alkylene oxide moieties include oxyethylene, oxypropylene, oxyisobutylene, oxy-n-butylene and oxy-(2-ethyl)hexalene. The oxyalkylene groups may be all the same or different as for example in poly(oxyethylene, oxypropylene)amine. Preferred poly(oxyalkylene)amines are the polyoxyethylene diamines and the polyoxypropylene diamines and triamines.

The polyamides are normally prepared by reacting stoichiometric equivalents (although acid or amine may be in excess if desired) of the polycarboxylic reactant and the polyamine reactant. The reaction mixture is normally heated to about 200°–300° C for about 1–5 hours and then further heated to about 400°–600° C for about 2–5 hours while the water and condensation formed is removed. Heating is continued until the desired molecular weight (usually measured in terms of viscosity of about 50 to 2,500 centiposies is attained).

The product is then recovered by cooling the reaction mixture.

Additional additives as noted (excluding water) may be contained in the modified polyamide (Component B) and may comprise approximately 0.5 to 10.0 wt. % of the total weight of Component B.

In order to impart color to the compositions disclosed herein a small quantity of any desired organic or inorganic color pigment is usually incorporated into Component B. Phthalocyanine in an amount from about 0.5 to about 0.75 wt. %, based on the weight of the adduct (Component B) has been found satisfactory. The color agents may also be incorporated in the compositions via Components A or C.

Curing agents may also be included in Component B, such as dimethylaminomethylphenol (DMP-10), tri(-dimethylaminomethyl)phenol (DMAPA), diethylene triamine (DEGA), dimethylaminopropylene (DMAPA), benzyldimethylamine (BDMA), etc., with DMP-30, that is tris(dimethylaminomethyl)phenol, being preferred. Acetic acid normally glacial acetic or similar acid may be included to make the adduct more compatable with the epoxy portion of the resin composition (i.e., Component A). The inclusion of a nonionic surfactant enables the epoxy resin and the modified polyamide to be readily mixed in the field. Suitable surfactants are polyoxyethylene lauryl ether, polyoxyethylene stearyl ether, polyoxyethylene triamine, poly(oxyethylene)nonyl phenol, etc., with the poly(oxyethylene)nonyl phenol being preferred.

These additives referred to above enhance the overall properties of the mixed material (Components A and B), e.g., increased pot life, mixed viscosity, application characteristics, etc.

The final component, Component C consists of powdered zinc dust. Zinc dust having a particle size range of 95% between 2–15 microns in diameter and averaging approximately 5 microns has proven quite satisfactory. By using such a fine zinc dust, corrosion resistance is greatly improved over larger also commercially available particle size dust. For example panels coated with the herein disclosed composition at 3.0 mils dry film thickness having zinc dust of the desired particle size were exposed to 5% salt fog for more than 2100 hours with no rust breakthrough, however, panels coated the same way using larger particle sizes averaging more than 6–9 microns showed decided rust breakthrough at 1500 hours.

The following examples illustrate both the production of the water soluble polyamides and the resin composition comprising Component A (liquid epoxy resin), Component B(polyamide-epoxy resin adduct), and Component C (particulate zinc dust). The examples are merely exemplary and not intended in any way to limit the scope of this invention. Parts and percentages are by weight. Example 1 and 2 illustrate the preparation of the polyamide; Example 3 illustrates preparation of the polyamide-epoxy adduct (Component B); Examples 4,5 and 6 illustrate the preparation of the final coating mixture comprising Components A, B, and C.

EXAMPLE 1

A mixture of 2.32 moles of a linoleic acid dimer (approx. carbon content $C_{36}$ - "Empol 1024" - trademeark of Emery Industries, Cincinatti, Ohio), 3.33 moles of a polyoxypropylene triamine derived from a trimethylol propane/propylene oxide polyether and having the formula:

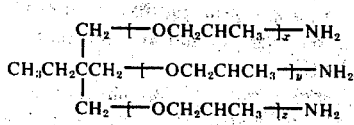

where $x + y + z = 5.3$ (approx.) and a molecular weight of about 400 ("Jeffamine T403" - trademark of Jefferson Chemical, Houston, Texas) was mixed together with 6.81 moles of diethylene triamine and heated to 250° C for 2 hours and then to 470° C for 3 hours; during which time 10 moles of water were removed. The product was non-volatile, had a base number of 400, was soluble in water and had a molecular weight corresponding to a viscosity of 589 poise (Gardner Hold viscosity of about T-U).

EXAMPLE 2

The dimer acids used in Examples 1 and 2 have the following composition in weight percent:

| Acid mixture | Dimer Acid ($C_{36}$ dibasic acid) | Tribasic Acid ($C_{54}$ dibasic acid) | Monobasic Acids ($C_{18}$ fatty) |
|---|---|---|---|
| Empol 1016 | 87 | 13 | Trace |
| Empol 1024 | 75 | 25 | Trace |

Accordingly, these acids are well known mixtures of dimer acid and trimer acid, having 18-54 carbon atoms and containing at least 75 weight percent dimer acid.

The procedure of Example 1 was repeated with 0.58 mole of a slightly lower molecular weight dimer acid ("Empol 1016"trademark), 0.87 mole of polyoxypropylene diamine having a molecular weight of about 190 and 1.27 moles of diethylene triamine. The product was non-volatile, water soluble, had a base number of 373 and a molecular weight corresponding to a viscosity of 756 poise (Gardner Hold viscosity of about U-V).

EXAMPLE 3

Component B, the modified polyamide or polyamide-epoxy resin adduct was prepared as follows: approximately 24 wt. % or about 202.5 lbs. of the polyamide solution prepared as in Examples 1 and 2 is added to an appropriate mixing tank (preferably of stainless steel) and combined with high speed power stirring with 1.2 wt. % or about 10.4 lbs. of a liquid grade epoxy resin consisting of the reaction product of epichlorohydrin and bis-phenol. A copolymer having an average epoxy equivalent weight of from about 180-188, a viscosity at 25° C of from about 6500-9500, and 0.7 wt. % or about 6.0 lbs. of phthalocyanine green pigment forming a paste. The temperature was recorded every 15 minutes. High speed mixing was continued until the temperature stopped climbing, at about 125° F and after about 2½ hours. The following components were then added sequentially to the mixture; 7.6 wt. % or approximately 64.4 lbs. of water with sufficient power mixing; 1.2 wt. % or approximately 10.4 lbs. of glacial acetic acid with sufficient mixing; 0.5 or approximately 4.2 lbs. of tris(-dimethylaminomethyl)phenol with sufficient mixing. The resultant mixture was then allowed to cool below 100 F. Note the glacial acetic acid should be added slowly and carefully using appropriate protective means.

After the mixture had cooled sufficiently, about 0.8 wt. % or 6.5 lbs. of poly(oxyethylated)nonylphenol is added with stirring to the above mixture. A 100 gallon quantity, weight approximately 974 lbs., was thus produced of Component B. All weight percentages referred to are with respect to the total weight of Component B only.

EXAMPLE 4

To produce a 100 gallon solution of the compositions embodied in this invention, 8.55 gallons, (82.9 lbs.) of Component A, DGEBA having an epoxy equivalent weight of from about 180-188 and an average viscosity at 25° C of from about 6500-9500, were poured with constant power stirring into 71.59 gallons (604.2 lbs.) of Component B mixing was continued for about 5 minutes and then 19.82 gal. (1173.9 lbs.) of Component C, zinc dust having a particle size averaging between 4-5 microns was added in small amounts with constant agitation until all the zinc dust had been added and the resultant mixture was smooth and free from lumps. To further insure smoothness, the mixture was strained through a 30-50 mesh screen.

EXAMPLE 5

To obtain a 5 gallon unit Components A, B, and C were mixed as in Example 4 in the following respective amounts: 0.43 gal. (4.18 lbs.), 3.58 gal. (30.21 lbs.), and .99 gal. (58.69 lbs.).

EXAMPLE 6

To obtain a 1 gallon unit mix as per Example 4, 0.08 gal. (0.83 lbs.) of Component A, 0.72 gal. (6.04 lbs.) of Component B and 0.20 gals. (11.74 lbs.) of Component C.

The product of this invention is superior to prior art water-based epoxy resin systems: its pot life is approximately triple that of comparable prior art compositions; the water solution is single phase making the compositions more resistance to freeze thaw liquidation than two-phased systems; preferably the product contains no solvent; and the compositions have high resistance to rust and other forms of corrosion particularly when applied to ferrous surfaces.

Although the present invention has been described with preferred embodiments, it is to be understood that modifications and variations may be resorted to without departing from the spirit and scope of the invention, as those skilled in the art will readily understand.

We claim:
1. A water-based epoxy/polyamide resin zinc-rich coating composition comprising:
   a. about 2-10 weight percent, based upon the total weight of the composition, of a non-volatile liquid grade epoxy resin diglycidyl ether of bisphenol A having an average epoxy equivalent weight of about 140-480 and an average viscosity of about 100-16,000 centipoises at 25° C.;
   b. a polyamide-epoxy resin adduct in which about 90 weight percent of the adduct or about 2-10 weight percent, based upon the total weight of the composition, is comprised of a water-soluble polyamide which is the reaction product of stoichiometric equivalents of
      i. a polycarboxylic acid comprising dimer acid and trimer acid having about 18-54 carbon atoms per carboxyl group and containing at least about 75 weight percent dimer acid and
ii. a polyamine reactant consisting of at least 10 mole percent poly(oxyalkylene)amine having 2-8 carbon atoms between adjacent ether oxygen atoms and the remainder of poly(alkylene)amine having a 4-8 carbon atoms per primary amine group and in which 10 weight percent of the adduct or about 0.1-3.0 weight percent, based upon the total weight of the composition, is an epoxy resin as defined in (a); and c. about 55-70 weight percent, based upon the total weight of the composition, of zinc dust having an average particle size of about 2-15 microns.

2. The composition of claim 1 wherein the zinc dust has an average particle size of about 4-6 microns.

3. The composition of claim 1 wherein the epoxy resin has an average epoxy equivalent weight of about 180-188 and an average viscosity of about 6500-9500 centipoises at 25° C.

4. The composition of claim 2 wherein the epoxy resin component, claimed therein includes a suitable reactive or a nonreactive diluent.

5. The composition of claim 1 wherein the polyamide-epoxy adduct claimed therein includes minor amounts of a suitable (1) emulsion agent, (2) nonionic or ionic surfactant, (3) curing agent, and (4) wetting agent.

6. The composition of claim 5, wherein said adduct contains a supplementary pigment.

* * * * *

UNITED STATES PATENT AND TRADEMARK OFFICE
CERTIFICATE OF CORRECTION

PATENT NO. : 3,998,771
DATED : December 21, 1976
INVENTOR(S) : THOMAS J. FENEIS, JR. and MILES T. BRYANT It is certified that error appears in the above-identified patent and that said Letters Patent are hereby corrected as shown below:

| | |
|---|---|
| Col. 4, line 67 | "trademeark" should be --trademark--. |
| Co. 5, line 19 | "Gardner Hold" should be --Gardner Holt--. |
| Col. 5, line 20 | Paragraph on lines 21-34 should follow Example 2, line 44. |
| Col. 5, line 68 | "100F." should be --100°F.--. |
| Col. 7, line 9 | "having a 4-8" should be --having 4-8--. |

Signed and Sealed this

Thirty-first Day of May 1977

[SEAL]

Attest:

RUTH C. MASON
Attesting Officer

C. MARSHALL DANN
Commissioner of Patents and Trademarks